United States Patent [19]

Gollin et al.

[11] Patent Number: 4,470,179
[45] Date of Patent: Sep. 11, 1984

[54] FASTENER-CLIP

[75] Inventors: Robert Gollin, Grenoble; Gaetan D'Aloia, Echirolles, both of France

[73] Assignee: A. Raymond, Lorrach, Fed. Rep. of Germany

[21] Appl. No.: 487,031

[22] Filed: Apr. 21, 1983

[30] Foreign Application Priority Data

Apr. 22, 1982 [DE] Fed. Rep. of Germany ....... 3215015

[51] Int. Cl.³ .......................... F16L 3/08; A44B 21/00
[52] U.S. Cl. ........................................ 24/543; 24/297; 24/457; 24/563; 248/74.3; 248/74.5
[58] Field of Search ................. 24/543, 563, 297, 544, 24/506, 513, 484, 457, 458, 30.5 P; 248/74.3, 74.5, 50, 113

[56] References Cited

U.S. PATENT DOCUMENTS

| 3,807,675 | 4/1974  | Seckerson et al. | 248/74.3 |
| 3,944,177 | 3/1976  | Yoda             | 248/74.3 |
| 3,954,238 | 5/1976  | Nivet            | 248/74.5 |
| 3,991,960 | 11/1976 | Tanaka           | 248/74.5 |
| 4,023,758 | 5/1977  | Yuda             | 248/74.5 |
| 4,386,752 | 6/1983  | Pavlak et al.    | 24/543   |

FOREIGN PATENT DOCUMENTS

| 2329563 | 1/1975  | Fed. Rep. of Germany | 248/74.3 |
| 2819923 | 11/1978 | Fed. Rep. of Germany | 248/74.3 |
| 2385966 | 10/1978 | France               | 248/74.3 |

Primary Examiner—Victor N. Sakran
Attorney, Agent, or Firm—Finnegan, Henderson, Farabow, Garrett & Dunner

[57] ABSTRACT

A fastener clip for fastening round stock to support bodies including an integral base and a pair of side walls defining a U-shaped fastening space. Elastically spreadable insertion walls are connected near their outer ends by easily bendable hinge strips to the side walls and extend into the fastening space in a V-shape fashion. Bosses on the side walls adjacent the hinge strips and slightly spaced from the hinge strips prevent outward pivoting of the insertion walls. A fastener foot on the base allows the clip to be fastened to a support body.

1 Claim, 3 Drawing Figures

FIG. 1
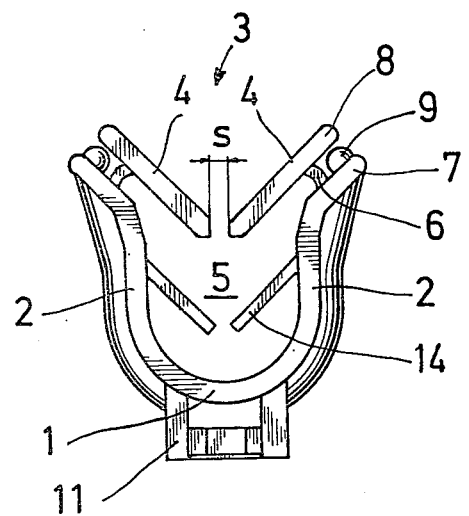
FIG. 2
FIG. 3
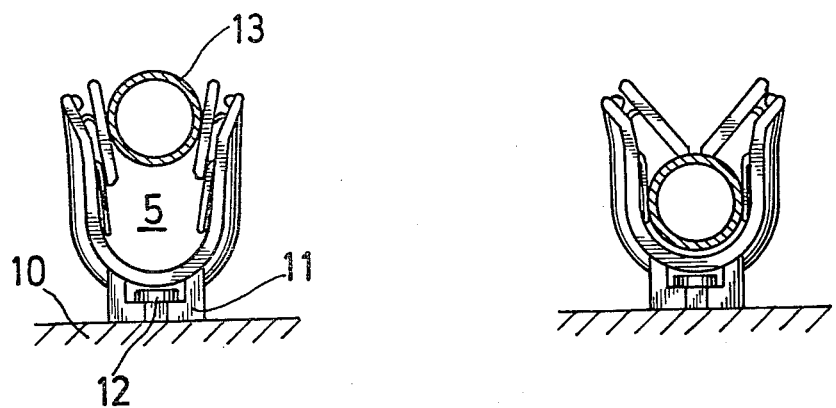

FASTENER-CLIP

BACKGROUND OF THE INVENTION

This invention is directed to a fastener clip made of a hard elastic plastic operable to fasten round stock such as tubing or cable conduits to support bodies. The fastener clip of this invention comprises a bottom part or base having a fastening foot secured thereto, and a pair of sidewalls defining with the foot a generally U-shaped fastening space having an entry aperture, and elastically spreadable insertion walls angling from the free ends of the side walls in approximately V-shaped manner into the fastening space and substantially covering the entry aperture.

Fastener clips of this general type are known and are disclosed, for instance, in German utility-model Pat. No. 81 02 462. In these devices, the insertion walls are used to introduce or guide the round stock, e.g., cable, into the fastening space in a more convenient manner and simultaneously to assure that the inserted cable can thereafter no longer move out of the fastening space even when subjected to external forces. When a cable is forced into place in the fastening space, the side walls elastically move away from each other because of the force components acting on them until the cable has passed the narrowest space between the insertion walls. Thereafter, the side walls snap back together until the entry aperture is closed by the insertion walls.

This know fastener clip incurs a drawback in that relatively high forces must be applied thereto during insertion of a cable due to the rigid integration or interconnection of the insertion walls to the side walls, and due to the requirement that the insertion walls be bent apart during cable insertion as a result of the relatively stiff construction of the side-walls.

SUMMARY OF THE INVENTION

Accordingly it is a main object of the invention to provide a fastener clip of the type described wherein easy insertion of cable, tubing and the like be facilitated without degrading the retaining force provided thereby.

The problems described above are solved and the advantages fulfilled by providing a fastener clip of the type described wherein the insertion walls are joined to the side walls by short, easily bendable strips or hinges. The side walls project approximately parallel to the insertion ends of the insertion walls beyond the junction site of the hinge strips and include bosses or the like at their free ends slightly spaced from the hinged or connecting strips which prevent outward pivoting of the insertion walls.

This novel construction provides that the insertion walls can easily move apart toward the inside surfaces of the fastening walls when a cable is inserted into the entry aperture. In addition, this construction provides that the fastening walls are retained in the closed position in a manner calculated to retain the cable therein after full insertion thereof and snap-back of the insertion walls, whereby the entry aperture remains firmly closed.

BRIEF DESCRIPTION OF THE DRAWINGS

An illustrative embodiment of the invention and also its operation are discussed below in reference to the drawings wherein:

FIG. 1 is a fastener clip constructed according to the invention and shown in elevation;

FIG. 2 is a view similar to FIG. 1 and to a reduced scale showing a cable or tubing during insertion;

FIG. 3 is a view similar to FIG. 2 showing the cable fully inserted.

DETAILED DESCRIPTION

The fastener clip shown in the drawings is constructed of a hard elastic plastic and, as shown in FIGS. 2 and 3, is used to fasten cable or tubing 13 or the like to a support body 10.

The fastener clip of this invention comprises a bottom part or base 1 having two rigid side walls 2 integrally formed therewith and defining a generally U-shaped fastening space 5 having an elastically spreadable entry aperture 3 for the tubing 13. A pair of fastening tongues 14 are joined in the side walls 2 and extend toward the center of the fastening space 5 and allow compensation for different diameters of the tubing 13 within certain limits. The entry aperture 3 is essentially covered or blocked by two insertion walls 4 which angle inwardly from free ends 7 of the side walls 2 toward the fastening space 5 and together form an approximate V-shape. The inner adjacent ends of the insertion walls 4 are spaced apart by a small gap "s" (FIG. 1) which is required for casting.

In accordance with the invention, the insertion walls 4 are easily forced apart to enlarge the entry aperture 3. As embodied herein, the insertion walls 4 are connected near their outer ends 8 and at their lower sides by means of easily bendable strips or hinges 6 to the outer ends 7 of the side walls 2. The side wall outer ends 7 project or extend approximately parallel to the insertion walls 4 beyond the junction sites of the hinge strips 6. The outer or free ends 7 of the side walls 2 furthermore are provided with bosses 9 or the like at a distance slightly spaced from the hinge strips so that in the normal or closed condition of the insertion walls 4, seen in FIG. 1, the bosses 9 are below and engage the lower side of the insertion walls 4. The purpose of this feature is to prevent the insertion walls 4 from pivoting outwardly and upwardly any further than the position shown in FIG. 1 after the cable or tubing 13 has been snapped into the fastener and the parts returned to the position shown in FIG. 3. The bosses 9 and the hinge strips 6 which, while flexible, are nevertheless tension proof and practically block the insertion walls 4 against any upward or outward motion beyond the position shown in FIG. 1. However, the hinge strips 6 easily allow movement of the insertion walls 4 out of the way toward the inside when the round tubing or stock is inserted (FIG. 2).

To mount the fastener clip to a support body 10, a fastening foot 11 which is integral with the bottom part 1 is anchored quickly and reliably to the support body 10 using a so-called linch pin 12 (FIG. 2). This kind of fastener is merely illustrative and can be replaced by any other suitable fastening device.

What is claimed is:

1. A fastener clip constructed of a hard elastic plastic operable to fasten round stock such as tubing or cable conduits onto support bodies, said fastener clip including a base provided with a fastener foot, two side walls formed integral with said base and defining a generally U-shaped fastening space having an entry aperture, and elastically spreadable insertion walls angled inwardly from the side walls and extending into the fastening space forming an approximate V-shape and substantially covering the entry aperture, characterized in that the insertion walls are connected adjacent their outer ends at their lower sides to the side walls by short, easily bendable hinge strips, said side walls projecting approximately parallel to the outer ends of the insertion walls beyond the junction site of the hinge strips, said side walls including bosses at their outer free ends slightly spaced from the hinge strips, said bosses extending almost to the lower side of said insertion walls to prevent outward or upward pivoting motion of the insertion walls.

* * * * *